US012131434B2

(12) United States Patent
Ito (10) Patent No.: US 12,131,434 B2
(45) Date of Patent: Oct. 29, 2024

(54) IMAGE PROCESSING APPARATUS, IMAGE PROCESSING METHOD, AND STORAGE MEDIUM (71) Applicant: CANON KABUSHIKI KAISHA, Tokyo (JP)

(72) Inventor: Hironao Ito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 57 days.

(21) Appl. No.: 17/824,465

(22) Filed: May 25, 2022

(65) Prior Publication Data
US 2022/0383603 A1    Dec. 1, 2022

(30) Foreign Application Priority Data

Jun. 1, 2021    (JP) ................................ 2021-092146

(51) Int. Cl.
*G06T 19/20* (2011.01)
*G06T 7/55* (2017.01)
*G06T 7/90* (2017.01)
*G06T 19/00* (2011.01)

(52) U.S. Cl.
CPC ............... *G06T 19/20* (2013.01); *G06T 7/55* (2017.01); *G06T 7/90* (2017.01); *G06T 19/006* (2013.01); *G06T 2200/08* (2013.01); *G06T 2219/2012* (2013.01)

(58) Field of Classification Search
CPC .. G06T 19/20; G06T 7/55; G06T 7/90; G06T 19/006; G06T 2200/08; G06T 2219/2012
USPC ....................................................... 345/419
See application file for complete search history.

(56) References Cited

U.S. PATENT DOCUMENTS

| 2010/0020077 | A1* | 1/2010 | Kumakura | G06T 19/20 345/589 |
| 2013/0129205 | A1* | 5/2013 | Wang | G06T 7/194 382/164 |
| 2013/0230237 | A1* | 9/2013 | Schlosser | G06T 7/194 382/164 |
| 2016/0133027 | A1* | 5/2016 | Zhao | G06T 7/194 382/173 |
| 2019/0335162 | A1* | 10/2019 | Kawahara | H04N 13/282 |
| 2021/0133944 | A1* | 5/2021 | Sakakima | G06T 7/97 |

(Continued)

FOREIGN PATENT DOCUMENTS

JP      2010-029397 A      2/2010
JP      2017211827 A      11/2017
(Continued)

OTHER PUBLICATIONS

Notice of Reasons for Refusal issued by the Japanese Patent Office on Apr. 2, 2024 in corresponding JP Patent Application No. 2021-092146, with English translation.

*Primary Examiner* — Jin Ge (74) *Attorney, Agent, or Firm* — Carter, DeLuca & Farrell LLP (57) ABSTRACT

An object is to appropriately determine a color of a three-dimensional model of an object. In an image processing apparatus, based on the analysis of the three-dimensional model of the object, the determination method of a color for the portion, which corresponds to the object shape of the component constituting the three-dimensional model, is made different from that for the portion, which does not correspond to the object shape.

19 Claims, 9 Drawing Sheets

(56) References Cited

U.S. PATENT DOCUMENTS

| | | | |
|---|---|---|---|
| 2021/0134058 A1 | 5/2021 | Ito et al. | |
| 2021/0233326 A1* | 7/2021 | Li | ............................ G06T 7/593 |
| 2021/0306616 A1 | 9/2021 | Ito | |
| 2021/0312638 A1 | 10/2021 | Ito | |
| 2022/0084300 A1* | 3/2022 | Izumi | ....................... G06T 15/04 |

FOREIGN PATENT DOCUMENTS

| | | |
|---|---|---|
| JP | 2018-205788 A | 12/2018 |
| JP | 2020-014159 A | 1/2020 |

\* cited by examiner

|  | Position condition | Color condition | Shape condition | Coloring method |
|---|---|---|---|---|
| Default | - | - | - | Standard |
| Condition 1 | z＜10(mm) | - | - | Colorless |

FIG.6B

|  | Position condition | Color condition | Shape condition | Coloring method |
|---|---|---|---|---|
| Default | - | - | - | Standard |
| Condition 1 |  | R : 0-1000<br>G : 2900-4095<br>B : 0-1000 | - | Fixed color<br>R : 100<br>G : 100<br>B : 100 |

FIG.6C

|  | Position condition | Color condition | Shape condition | Coloring method |
|---|---|---|---|---|
| Default | - | - | - | Standard |
| Condition 1 | z＜10(mm) | R : 0-1000<br>G : 2900-4095<br>B : 0-1000 | - | Color obtained by subtracting 300 for each of RGB from color of camera image |

FIG.6D

|  | Position condition | Color condition | Shape condition | Coloring method |
|---|---|---|---|---|
| Default | - | - | - | Standard |
| Condition 1 | z＜10(mm) | - | (c),(f),(k) | Colorless |

Cylinder, vertically oriented
FIG.7A

Cylinder, difference between vertical and horizontal lengths is small
FIG.7B

Cylinder, horizontally oriented
FIG.7C

Cuboid, vertically oriented
FIG.7D

Cuboid, difference between vertical and horizontal lengths is small
FIG.7E

Cuboid, horizontally oriented
FIG.7F

Cone, vertically oriented
FIG.7G

Cone, difference between vertical and horizontal lengths is small
FIG.7H

Cone, horizontally oriented
FIG.7I

Human type
FIG.7J

Ellipse
FIG.7K

Sphere
FIG.7L

FIG.9B

IMAGE PROCESSING APPARATUS, IMAGE PROCESSING METHOD, AND STORAGE MEDIUM

BACKGROUND

Field

The present disclosure relates to a technique to color a three-dimensional model of an object.

Description of the Related Art

In recent years, a technique has been attracting attention, which generates a virtual viewpoint image representing an appearance from a designated viewpoint (virtual viewpoint) by installing a plurality of image capturing devices at different positions, performing synchronous image capturing form a plurality of viewpoints, and using a plurality of captured images obtained by the image capturing. At the time of generating a virtual viewpoint image, generally, a three-dimensional model of an object existing in the image capturing-target space from a plurality of captured images and a color in a case where the object is viewed from an arbitrary virtual viewpoint in the image capturing-target space is attached to the three-dimensional model (see Japanese Patent Laid-Open No. 2017-211827).

For example, there is a case where a virtual viewpoint image for a television commercial or a music video is generated from a plurality of captured images obtained by capturing a three-dimensional model of a performer with green back in an indoor studio. At this time, it is possible to obtain a virtual viewpoint image in which, for example, a performer seems to be floating in the air by attaching the color in a case where the performer is viewed from the virtual viewpoint to the three-dimensional model of the performer (in the following, called "foreground model") and then combining it with a background, such as CG prepared in advance. However, at the time of generating the foreground model from the images captured in the indoor studio, there is a case where, for example, the shadow of the performer him/herself is recognized as part of the shape of the performer and in the completed foreground model, the portion not corresponding originally to the shape of the object is included as a noise.

In a case where the above-described noise is included in the foreground model, in the coloring processing thereof, to the portion corresponding to the noise, the color of the wall or the floor (for example, in the green back image capturing environment, green) in the image capturing-target space or the color of another object is attached.

SUMMARY

Further features of the present disclosure will become apparent from the following description of exemplary embodiments with reference to the attached drawings.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

First, an outline of a virtual viewpoint image is explained briefly. The virtual viewpoint image is an image representing an appearance from a virtual camera viewpoint (virtual viewpoint) different from a real camera viewpoint and also called a free-viewpoint image. The virtual viewpoint is set by a user directly designating it by operating a controller, or for example, by a method of selecting from among a plurality of virtual viewpoint candidates set in advance, and so on. The virtual viewpoint image includes both a moving image and a still image, and in the following embodiment, explanation is given on the premise that the virtual viewpoint image is a moving image and the virtual viewpoint image by a moving image is represented as a "virtual viewpoint image".

<About System Configuration>

Figure 1:
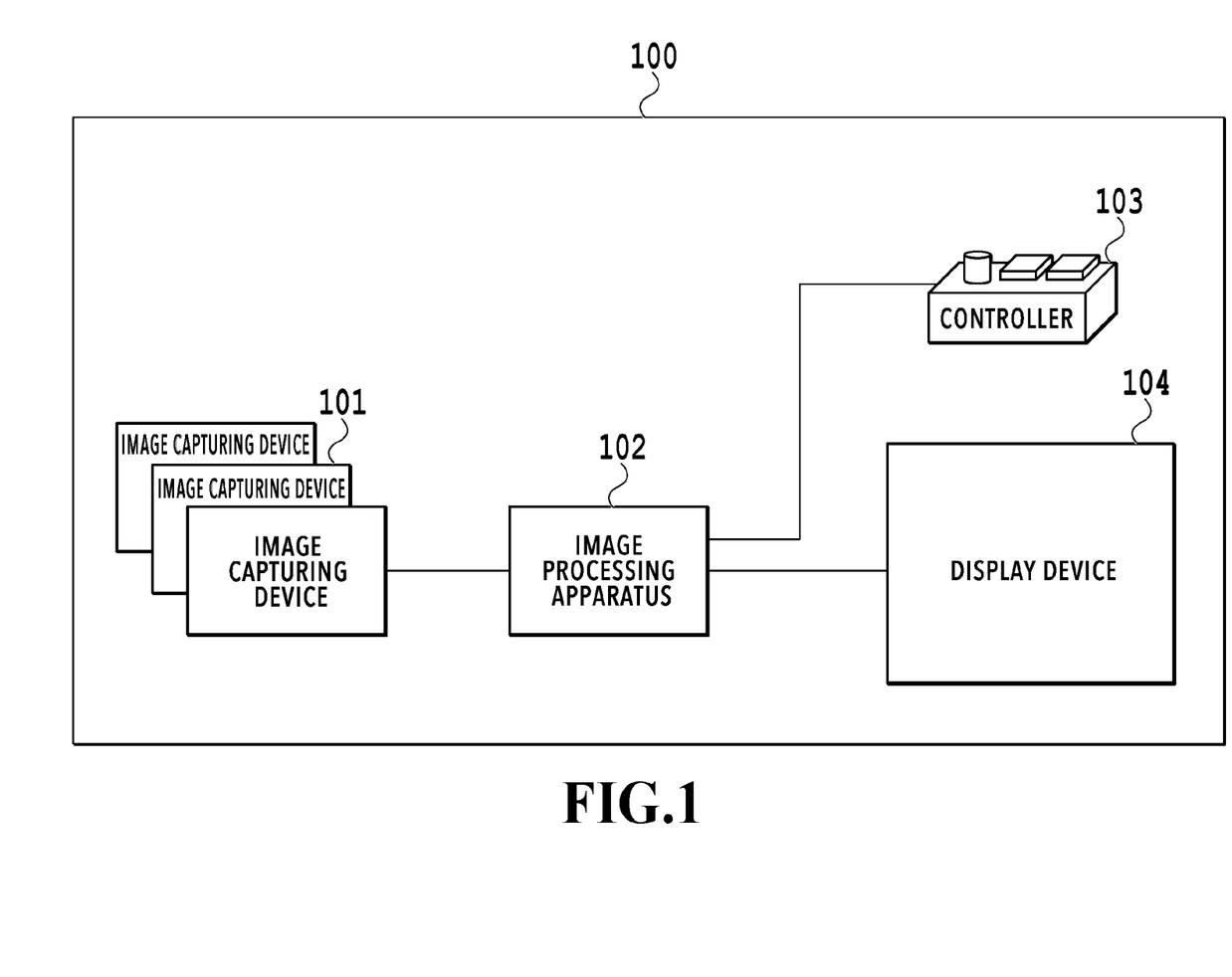
FIG. 1 is a diagram showing an example of a configuration of an image processing system for generating a virtual viewpoint image.

FIG. 1 is a diagram showing an example of a configuration of an image processing system for generating a virtual viewpoint image. An image processing system 100 has a plurality of image capturing devices (cameras) 101, an image processing apparatus 102, a controller 103, and a display device 104. In the image processing system 100, the image processing apparatus 102 generates a virtual viewpoint image based on a plurality of captured images (in the present embodiment, moving images. In the following, called "camera images") by synchronous image capturing of the plurality of the cameras 101 and displays the virtual viewpoint image on the display device 104. For example, in a case where a virtual viewpoint image is generated by taking a sports game played in a stadium as a target, the cameras 101 are installed at different positions so as to surround the field within the stadium and each camera 101 performs image capturing of the field in time synchronization. However, in case where there is a limit to the installation position, such as in a studio and a concert hall, the plurality of the cameras 101 is installed only in part of the directions of the image capturing-target area. Each camera 101 is implemented by, for example, a digital video camera including an image signal interface represented by a serial digital interface (SDI). Each camera 101 attaches time information represented by a time code to the image signal that is output and transmits the image signal to the image processing apparatus 102.

The image processing apparatus 102 generates a virtual viewpoint image based on the plurality of camera images obtained by the plurality of the cameras 101 performing synchronous image capturing. The image processing apparatus 102 generates a virtual viewpoint image by performing the generation of the shape data (in the following, called "foreground model") indicating the three-dimensional shape of an object, such as a person, which is the foreground, by using the plurality of camera images obtained via a network cable and the processing to color the foreground model. Details of the function of the image processing apparatus 102 will be described later. The coloring processing is processing to determine a color for the component constituting the foreground model.

The controller 103 is a control device for a user to designate a virtual viewpoint or to perform various settings. An operator performs various settings, inputs data, and so on, necessary for generating a virtual viewpoint image via an input device, such as a joystick and a keyboard of the controller 103. Specifically, an operator designates the position and the line-of-sight direction of the virtual viewpoint, designates the keyframe, sets the operation mode relating to the coloring of the foreground model, selects the condition table that is used in a case where the operation mode is ON, and so on.

The display device 104 obtains image data (data of the UI screen for the graphical user interface and data of the virtual viewpoint image) that is sent from the image processing apparatus 102 and displays the image data. The display device 104 is implemented by, for example, a liquid crystal display, an LED and the like.

<About Hardware Configuration>

Figure 2:
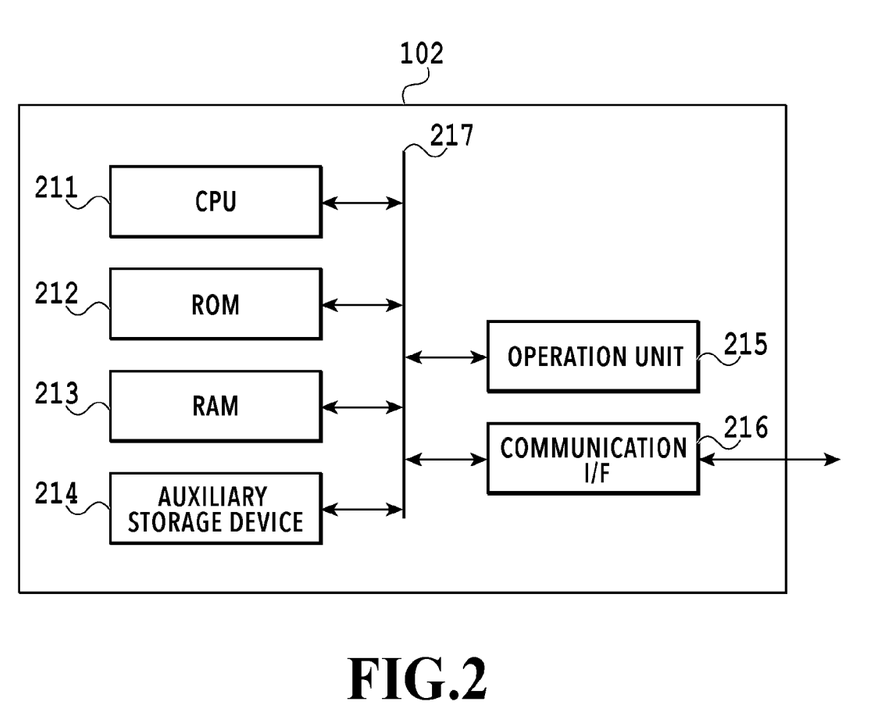
FIG. 2 is a diagram showing a hardware configuration of an image processing apparatus.

FIG. 2 is a diagram showing the hardware configuration of the image processing apparatus 102. The image processing apparatus 102, which is an information processing apparatus, has a CPU 211, a ROM 212, a RAM 213, an auxiliary storage device 214, an operation unit 215, a communication I/F 216, and a bus 217.

The CPU 211 implements each function of the image processing apparatus 102 by controlling the entire image processing apparatus 102 by using computer programs and data stored in the ROM 212 or the RAM 212. It may also be possible for the image processing apparatus 102 to have dedicated one piece or a plurality of pieces of hardware different from the CPU 211 or a GPU (Graphics Processing Unit). Then, it may also be possible for the GPU or the dedicated hardware to perform at least part of the processing by the CPU 211. As the example of the dedicated hardware, there are an ASIC (Application Specific Integrated Circuit), an FPGA (Field Programmable Gate Array), a DSP (Digital Signal Processor) and the like.

The ROM 212 stores programs that do not need to be changed. The RAM 213 temporarily stores programs and data supplied from the auxiliary storage device 214, data supplied from the outside via the communication I/F 217, and the like. The auxiliary storage device 214 includes, for example, a hard disk drive and the like, and stores various kinds of data, such as image data and volume data.

The operation unit 215 includes, for example, a keyboard, a mouse and the like and inputs various instructions to the CPU 211 upon receipt of the operation by a user. The CPU 211 operates as the display control unit configured to control the display device 104 and as the operation control unit configured to control the operation unit 215. The communication I/F 216 is used for communication with an external device of the image processing apparatus 102. For example, in a case where the image processing apparatus 102 is connected with an external device by wire, a communication cable is connected to the communication I/F 216. In a case where the image processing apparatus 102 has a function to wirelessly communicate with an external device, the communication I/F 216 comprises an antenna.

The bus 214 connects each unit of the image processing apparatus 102 and transmits information. In the present embodiment, the controller 103 and the display device 104 are provided as external devices, but it may also be possible to provide each of them in the form in which each internally exists as one of the function units of the image processing apparatus 102.

<About Software Configuration>

Figure 3:
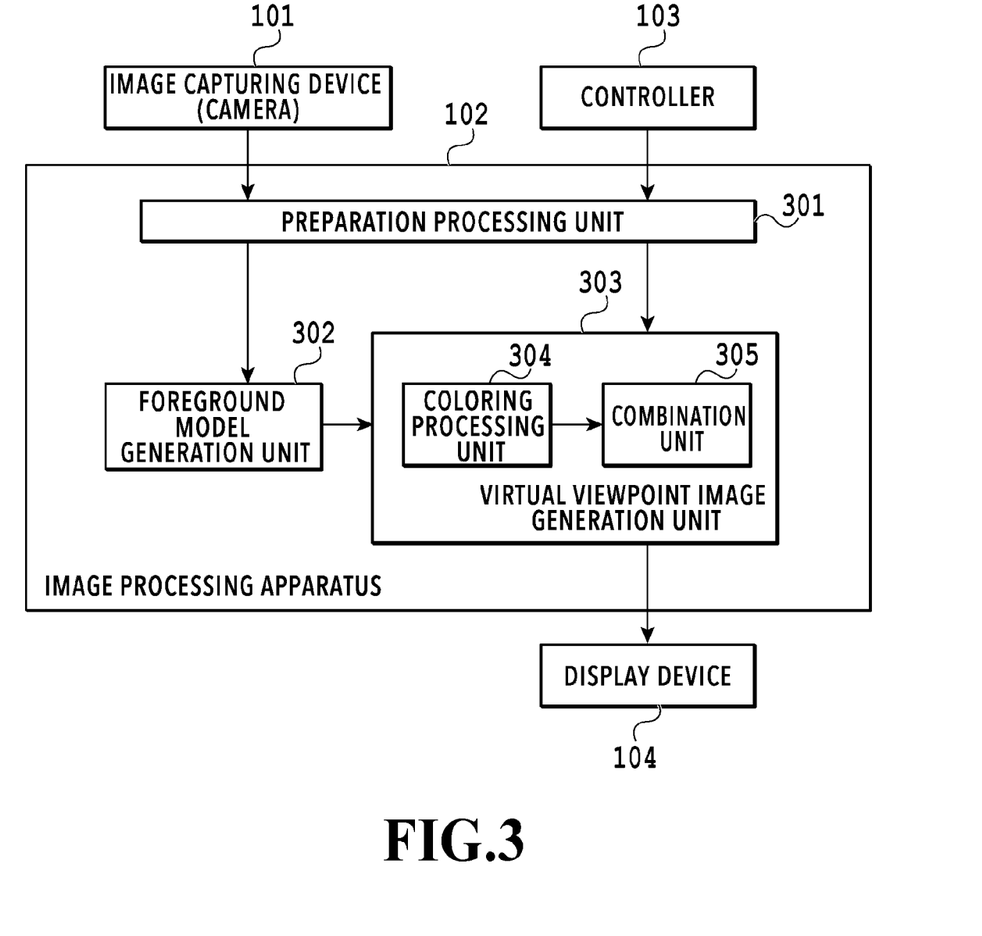
FIG. 3 is a diagram showing a software configuration of the image processing apparatus.

FIG. 3 is a diagram showing the software configuration of the image processing apparatus 102. The image processing apparatus 102 that generates a virtual viewpoint image from a plurality of images obtained by synchronous image capturing has a preparation processing unit 301, a foreground model generation unit 302, and a virtual viewpoint image generation unit 303. Then, the virtual viewpoint image generation unit 303 includes a coloring processing unit 304 and a combination unit 305. In the following, each function is explained.

The preparation processing unit 301 performs preparation processing necessary for generating a virtual viewpoint image. In the preparation processing, the obtaining of a plurality of camera images captured in synchronization, the setting of the operation mode relating to the coloring method change control and the specified area, the reading of the condition table that is used in a case where the operation mode is ON, the obtaining of the virtual viewpoint data specifying the position and the line-of-sight direction of the virtual viewpoint, and the like are included.

The foreground model generation unit 302 generates a foreground model by, for example, the visual volume intersection method based on the obtained plurality of camera images. In the generation of a foreground model, first, foreground/background separation processing to extract a specific object, such a performer, which is the foreground, for each frame is performed. The method of extracting an object is not limited in particular and for example, the background difference method is used. The background difference method is a method of extracting the silhouette of the object within the fame by comparing the pixel values between each frame (still image) and the background image showing the background portion thereof. The background image is obtained in advance by, for example, capturing the studio in which no performer exists and so on, in a case where a virtual viewpoint image is generated by taking a drama and a performance within the studio as a target. The image (called "foreground image" or "foreground mask") indicating the silhouette of the object, which is obtained by the preparation processing unit 301, is temporarily stored in the auxiliary storage device 214 along with image capturing position information indicating the three-dimensional position of the camera 101. The three-dimensional position is specified by the positions of three axes (x-axis, y-axis, z-axis) corresponding to the height, width, and depth of the image capturing-target three-dimensional space (in the following, described as "image capturing-target space"). Then, based on the foreground image, by the visual volume intersection method, a foreground model is generated. The visual volume intersection method is a method in which the image capturing-target space is divided into fine cuboids (voxels), the pixel position in a case where each voxel is captured in the plurality of camera images is calculated, and whether or not each voxel corresponds to the pixel corresponding to the silhouette of the object is determined. The voxel determined to be the pixel corresponding to the silhouette of the object in the plurality of camera images is specified as the voxel constituting the three-dimensional shape of the object. Then, in the image capturing-target space, the specified voxels are caused to remain and other voxels are deleted and the set of the voxels ("voxel block") that remain finally is the shape data indicating the three-dimensional shape of the object. Each voxel constituting the foreground model has three-dimensional coordinate values (in units of mm) specified by the above-described (x, y, z). In the present embodiment, it is assumed that the foreground model is represented by voxels, but it may also be possible to represent the foreground model by a set of finer points (point cloud). Further, for example, it may also be possible to take one representing the three-dimensional shape of the object by a plane (polygon mesh) obtained by connecting vertexes of a plurality of adjacent voxels as the foreground model.

The virtual viewpoint image generation unit 303 generates a virtual viewpoint image by coloring the foreground model based on the camera image of each of the cameras 101 and the virtual viewpoint designated by a user and combining the colored foreground model with the background data prepared in advance. The virtual viewpoint image generation unit 303 has the coloring processing unit 304 configured to perform the processing relating to the coloring of the foreground model and the combination unit 305 configured to combine the colored foreground model and the background data. The coloring processing unit 304 first performs the analysis processing of the input foreground model and determines the coloring method (specifies the determination method of color) for each voxel. Here, the standard coloring is performed by three-dimensionally calculating how the foreground model is displayed in the camera viewing angle in a case where the foreground model is viewed from the virtual viewpoint (virtual camera) and using the color of the camera image of the real camera 101 closest to the virtual camera. In the present embodiment, further, for the voxels of the portion determined not to represent the shape of the object among the voxels constituting the foreground model, coloring is performed by a coloring method different from the above-described standard coloring method. Details of the coloring processing unit 304 will be described later. The combination unit 305 generates a virtual viewpoint image by combining the colored foreground model that is output from the coloring processing unit 304 with the background data prepared in advance. Here, the background data is the background model to which the texture information created by, for example, CG, is attached and the background data stored in the auxiliary storage device 214 is read and used.

The function configuration of the image processing apparatus 102 shown in FIG. 3 is an example and it may also be possible to perform the function to extract the foreground image from the plurality of camera images, the function to generate the foreground model, and the function to perform coloring of the foreground model by dividing the functions to each of different image processing apparatuses. For example, the configuration may be one in which the function of the foreground model generation unit 302 is performed by another image processing apparatus and the image processing apparatus 102 is in charge of only the function of the virtual viewpoint image generation unit 303.

<Details of Coloring Processing Unit>

Figure 4:
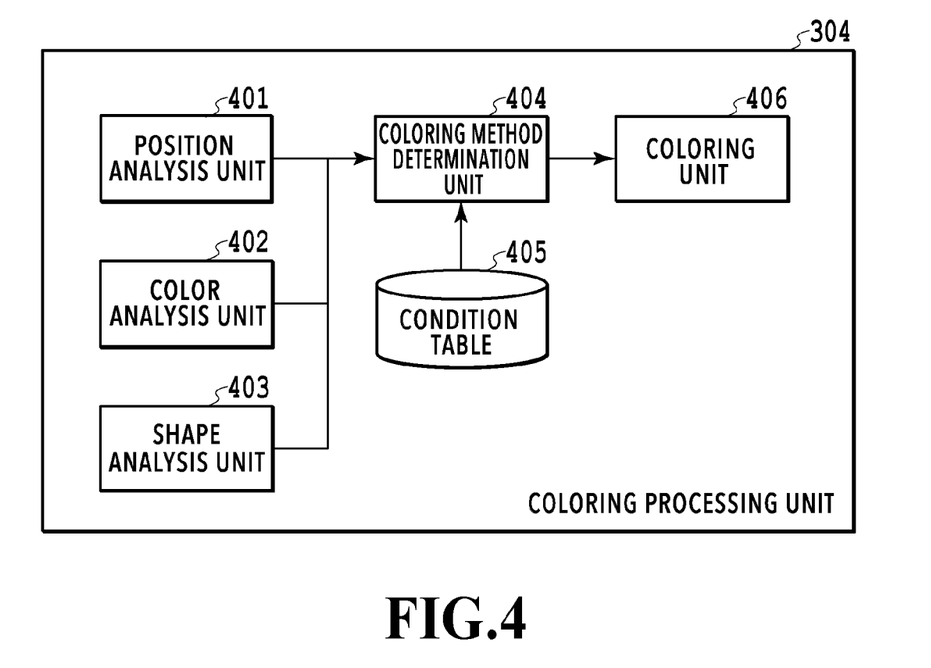
FIG. 4 is a block diagram showing an internal configuration of a coloring processing unit.

FIG. 4 is a block diagram showing the internal configuration of the coloring processing unit 304. The coloring processing unit 304 has a position analysis unit 401, a color analysis unit 402, a shape analysis unit 403, a coloring method determination unit 404, a condition table 405, and a coloring unit 406. The coloring processing unit 304 performs the control to change the coloring method in a case where the operation mode described previously is set to ON. In the following, with reference to FIG. 4, the processing performed by the coloring processing unit 304 is explained in detail.

The position analysis unit 401 specifies the three-dimensional position of each voxel constituting the input foreground model. As described previously, to each voxel constituting the foreground model, coordinate information indicating the position in the image capturing-target space is attached. The position analysis unit 401 specifies the three-dimensional position by reading the coordinate information on each voxel of the foreground model. The specified coordinate information on each voxel is sent to the coloring method determination unit 404.

The color analysis unit 402 specifies the color of each voxel constituting the input foreground model in a case where the voxel is viewed from the virtual viewpoint based on the information on the position, the line-of-sight direction, and the viewing angle of the virtual viewpoint that is set via the controller 103. The specified color information on each voxel is sent to the coloring method determination unit 404.

The shape analysis unit 403 specifies the three-dimensional shape indicated by the foreground model. Here, the specified area is the area within the image capturing-target space, which is designated in advance by a user or the like and means the area expected to include the portion corresponding to the noise of the foreground model. A user sets a predetermined range 502 whose height from the ground surface is, for example, about 15 cm as the specified area in the image capturing-target space. At this time, it may also be possible to enable a user to set the specified area by, for example, displaying the generated virtual viewpoint image on the display device 104 and by a user designating a desired area within the virtual viewpoint image by using a mouse and the like. The shape analysis unit 403 specifies the shape of the voxel block of the portion included in the specified area of the foreground model generated in the image capturing-target space by pattern matching and the like. The shape information on the voxel block included in the specified area thus specified is sent to the coloring method determination unit 404.

Figure 5A:
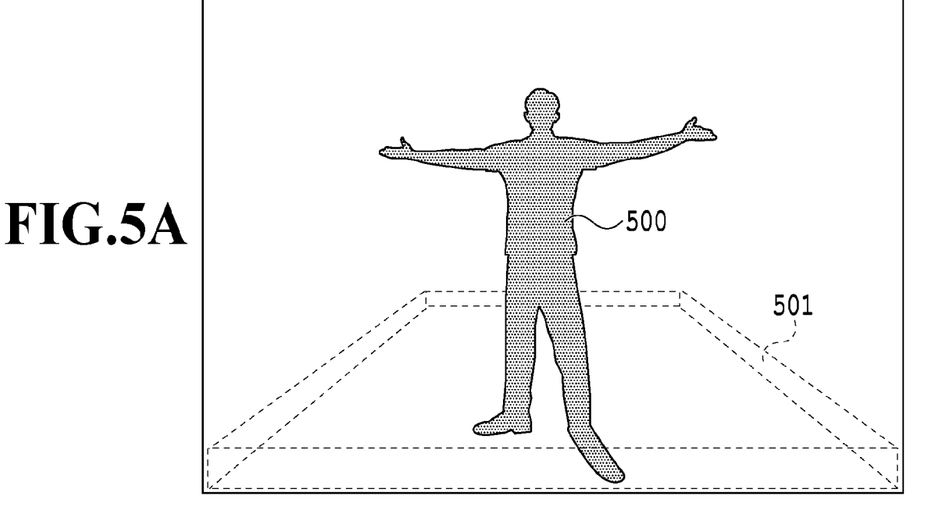
FIG. 5A and FIG. 5B are each a diagram showing a specified area.
Figure 5B:
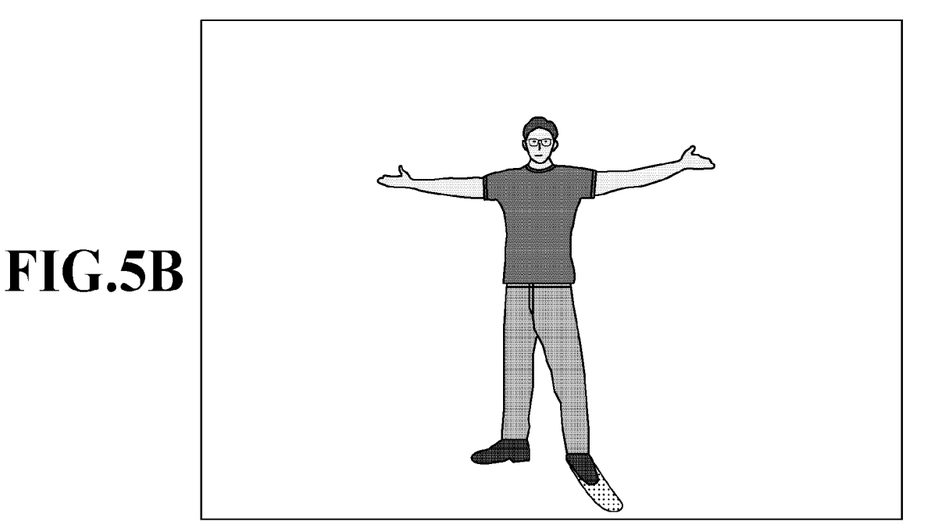

The coloring method determination unit 404 refers to the condition table 405 and determines the coloring method of the voxel constituting the input foreground model based on the analysis results of the position analysis unit 401, the color analysis unit 402, and the shape analysis unit 403. Then, in a case where the area for which the control to change the coloring method is designated for the image capturing-target space, the coloring method of each voxel is performed by taking the specified area as a target. FIG. 5A shows an example of the specified area. Here, in a foreground model 500 generated for a person standing within a studio, the toe of the left foot is extended abnormally. In a case where coloring is performed by the conventional method for the foreground model 500 including the noise such as this, as shown in FIG. 5B, to the noise portion, the color of the floor of the studio is attached. In a case where the occurrence of the noise such as this is expected, a user sets a predetermined area 501 whose height form the ground surface is, for example, about 15 cm in the image capturing-target space as the specified area via the controller 103. At this time, for example, it may also be possible to enable a user to set the specified area by displaying the generated virtual viewpoint image on the display device 104 and by a user designating a desired area within the virtual viewpoint image by using a mouse and the like.

FIG. 6A to FIG. 6D each show an example of the condition table 405. The condition table is a table storing conditions that are taken as a reference at the time of determining the coloring method of the foreground model. As described previously, the standard coloring is implemented by determining the camera image located at the position at which it is possible to color the target foreground model based on the angle formed by the real camera and the foreground model, the distance between the real camera and the foreground model, and the like and attaching the color of the determined camera image to the foreground model. However, in a case where a noise has occurred in the input foreground model, on a condition that the above-described standard coloring method is used, the color of the floor or the like is attached erroneously to the portion corresponding to the noise. Consequently, the coloring method determination unit 404 determines the coloring method for each voxel constituting the foreground model based on the analysis results and the condition table so that natural coloring without a sense of incongruity from the background is performed for the portion corresponding to the noise of the input foreground model. In the following, the case is divided and a specific determination method is explained.

<<Determination by Only Coordinate Information>>

Figure 6A:
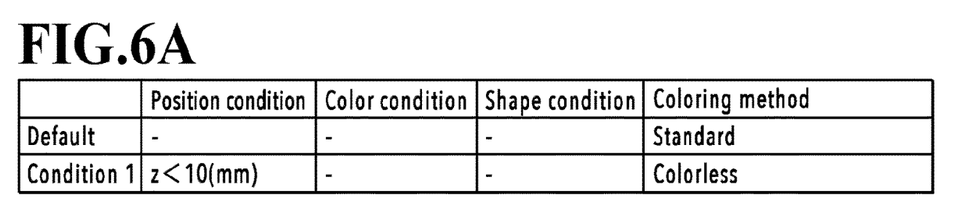
FIG. 6A to FIG. 6D are each a diagram showing an example of a condition table.

FIG. 6A is an example of a position condition table that is referred to in a case where the coloring method is determined based on only the voxel coordinate information. As described in the paragraphs [0003] and [0004]of the specification as originally filed, there are many cases where the shadow of a person or the like is erroneously recognized as the foreground and taken in as a noise in the foreground model and the color of the floor is attached to the voxel corresponding to the nose as a false color. Consequently, by using the position condition table as in FIG. 6A, the coloring method is determined so that the voxels located at the position close to the floor become colorless (no color is attached to the voxels) and the standard coloring is performed for the other voxels. Specifically, to the voxel whose z-axis value is larger than or equal to a threshold value, which indicates the height from the ground surface, in the voxel coordinate information, information (for example, flag value) indicating that the standard coloring is performed is attached and to the voxel whose z-axis value is less than the threshold value, information indicating colorlessness is attached. The position condition table in FIG. 6A is an example in a case where "10 mm" is set as the z-axis threshold value and it is sufficient for a user to set in advance the numerical value or the like as the threshold value via, for example, the controller 103.

<<Determination by Only Color Information>>

Figure 6B:
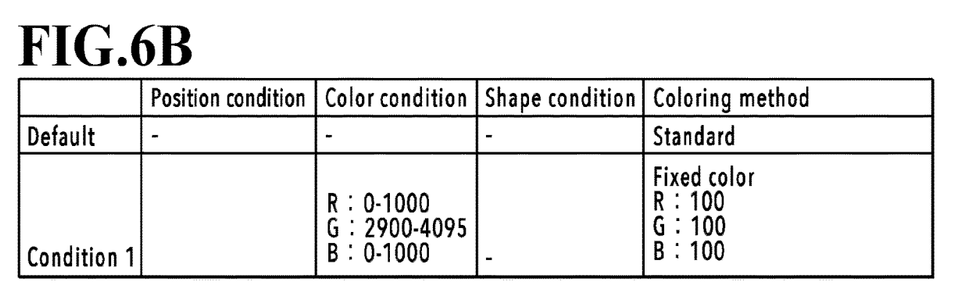

FIG. 6B is an example of a color condition table that is referred to in a case where the coloring method is determined based on only the voxel color information. In a case where a foreground model of a performer is generated by performing chroma key image capturing within a studio, image capturing is performed in a space surrounded by a specific color called green back or blue back. Consequently, by using the color condition table as in FIG. 6B, the coloring method is determined so that the voxel whose color (color that is determined in a case where the standard coloring method described previously is applied) that is derived from the virtual viewpoint is the color close to the above-described specific color comes to have a fixed color. Specifically, to the voxel whose color luminance of RGB is included in a predetermined range in the voxel color information, information indicating that the color of the voxel is a fixed color is attached and to the voxel whose color luminance is not included in the predetermined area, information indicating that the color of the camera image is used is attached. In the color condition table in FIG. 6B, the specific color is taken to be "green" and as the above-described predetermined range in a case where the maximum value of the color luminance of RGB is 4,096 (12 bits), R is taken to be "0 to 1,000", G is taken to be "2,900 to 4,095", and B is taken to be "0 to 1,000". Then, as the above-described fixed color, gray whose (R, G, B)=(100, 100, 100) is set.

<<Determination by Combination of Position Information and Color Information>>

Figure 6C:
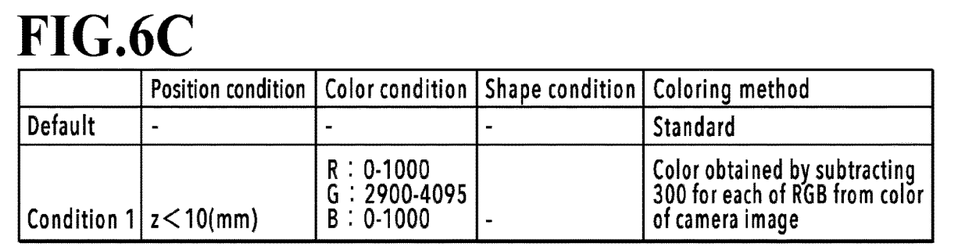

FIG. 6C is an example of a combination condition table that is referred to in a case where the coloring method is determined based on the combination of voxel position information and color information. Ina case of the combination condition table in FIG. 6C, for the voxel whose z-axis value is small (that is, the voxel position is close to the floor) and whose color derived from the virtual viewpoint is close to the specific color, the coloring method is determined so that the color of the voxel is the color obtained by performing predetermined modification for the color of the camera image. Here, in the condition table in FIG. 6C, it is specified that the color of the voxel that meets the above-described condition is the color obtained by subtracting "300" from the value of the color luminance by taking the color of the camera image derived from the virtual viewpoint as a reference.

<<Determination of Combination of Position Information and Shape Information>>

Figure 6D:
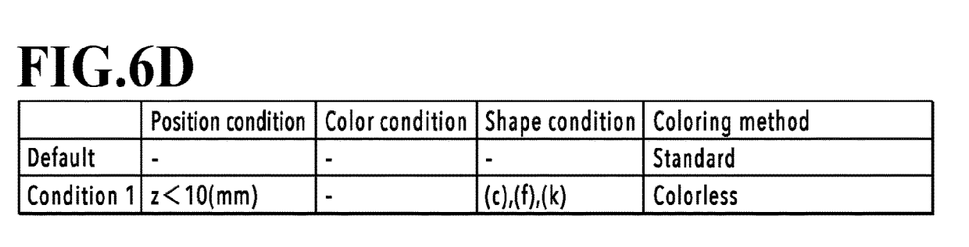
Figure 7A:
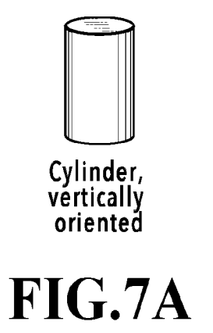
FIG. 7A to FIG. 7L are each a diagram showing an example of a unit shape.
Figure 7B:
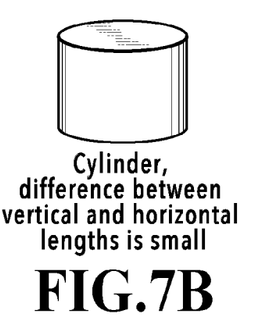
Figure 7C:
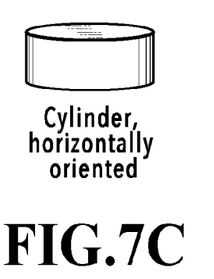
Figure 7D:
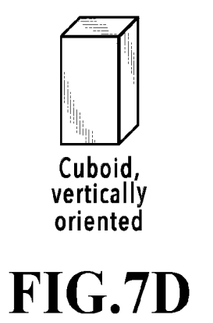
Figure 7E:
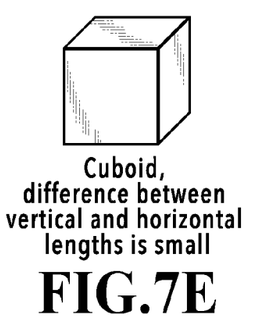
Figure 7F:
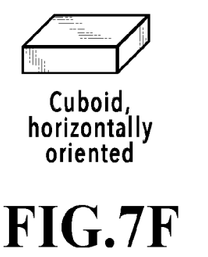
Figure 7G:
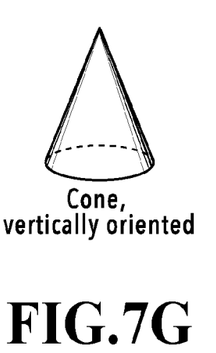
Figure 7H:
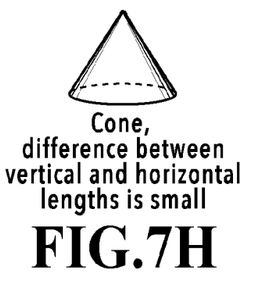
Figure 7I:
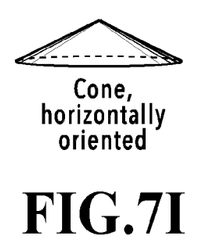
Figure 7J:
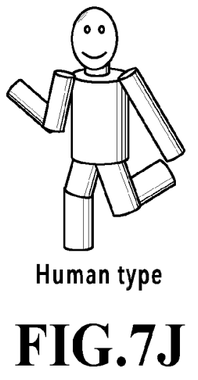
Figure 7K:
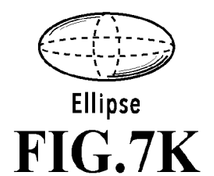
Figure 7L:
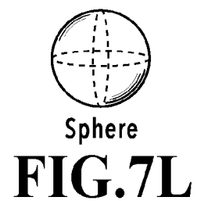

FIG. 6D is an example of a combination condition table that is referred to in a case where the coloring method is determined based on the combination of voxel position information and voxel block shape information. In a case of the combination condition table in FIG. 6D, for the voxel corresponding to the portion whose z-axis value is small (that is, the position is close to the floor) and which corresponds to a predetermined thin shape of the foreground model, the coloring method is determined so that the voxel becomes colorless (that is, no color is attached to the voxel). Here, in the condition table in FIG. 6D, the shape condition is specified that the shape of the foreground model included in the specific area matches with one of (c), (f), and (k) among the unit shapes shown in FIG. 7A to FIG. 7L.

As described above, for the voxel of the portion corresponding to noise of the foreground model, the coloring method different from the standard coloring method is allocated so that a color without a sense of incongruity is attached. As the coloring method different from the standard coloring method, for example, mention is made of the following methods.

No coloring (colorless)
Fixed color determined in advance
Color obtained by converting the color derived from the camera image by a predetermined method
The same color as the color of the background data In the present embodiment, explanation is given on the assumption that "no coloring" and "colorless" have the same meaning. The reason is that depending on the specifications of the device that performs rendering processing, it is possible to represent both and the technical effects are the same. Then, "colorless" includes a case of complete transparency by so-called alpha blending. Further, in a case of the same color as the color of the background data, it may also be possible to use the color on the straight line connecting the virtual viewpoint and the target voxel, in addition to using the color at the closest position in the background data. As regards the "conversion by a predetermined method", it may also be possible to perform nonlinear conversion by using, for example, an LUT (lookup table) or the like in place of the method of reducing the luminance by a predetermined amount shown in FIG. 6C. Further, similarly in a case of the same color as that of the color of the background data as well, it may also be possible to produce a color darkened by a predetermined amount by reducing the luminance of the color of the background data, or perform conversion using an LUT and the like. In the explanation of the condition table in FIG. 6C and FIG. 6D, the logical product (AND) of the two conditions is taken, but this is not limited and for example, the logical sum (OR) or the like may be taken. Further, in the determination of whether the condition is met, it is possible to use a general comparison method, such as whether the comparison-target value is "larger than or equal to", "smaller than or equal to", "greater than", "less than", or whether "the difference is within xx", and the "difference is larger and or equal to xx".

The data of the foreground model whose coloring method is designated for each voxel as described above is sent to the coloring unit 406. In the present embodiment, the coloring method is determined for each voxel, which is the component of the foreground model, but it may also be possible to determine the coloring method for a plurality of voxels.

The coloring unit 406 performs processing to perform coloring by the coloring method determined for each voxel for each voxel of the input foreground model. At this time, in a case where the information indicating the coloring method indicates that the standard coloring is performed, coloring is performed by using the camera image of the real camera closest to the virtual viewpoint and in a case where the information indicates colorlessness, coloring is not performed.

<Generation Processing of Virtual Viewpoint Image>

Figure 8:
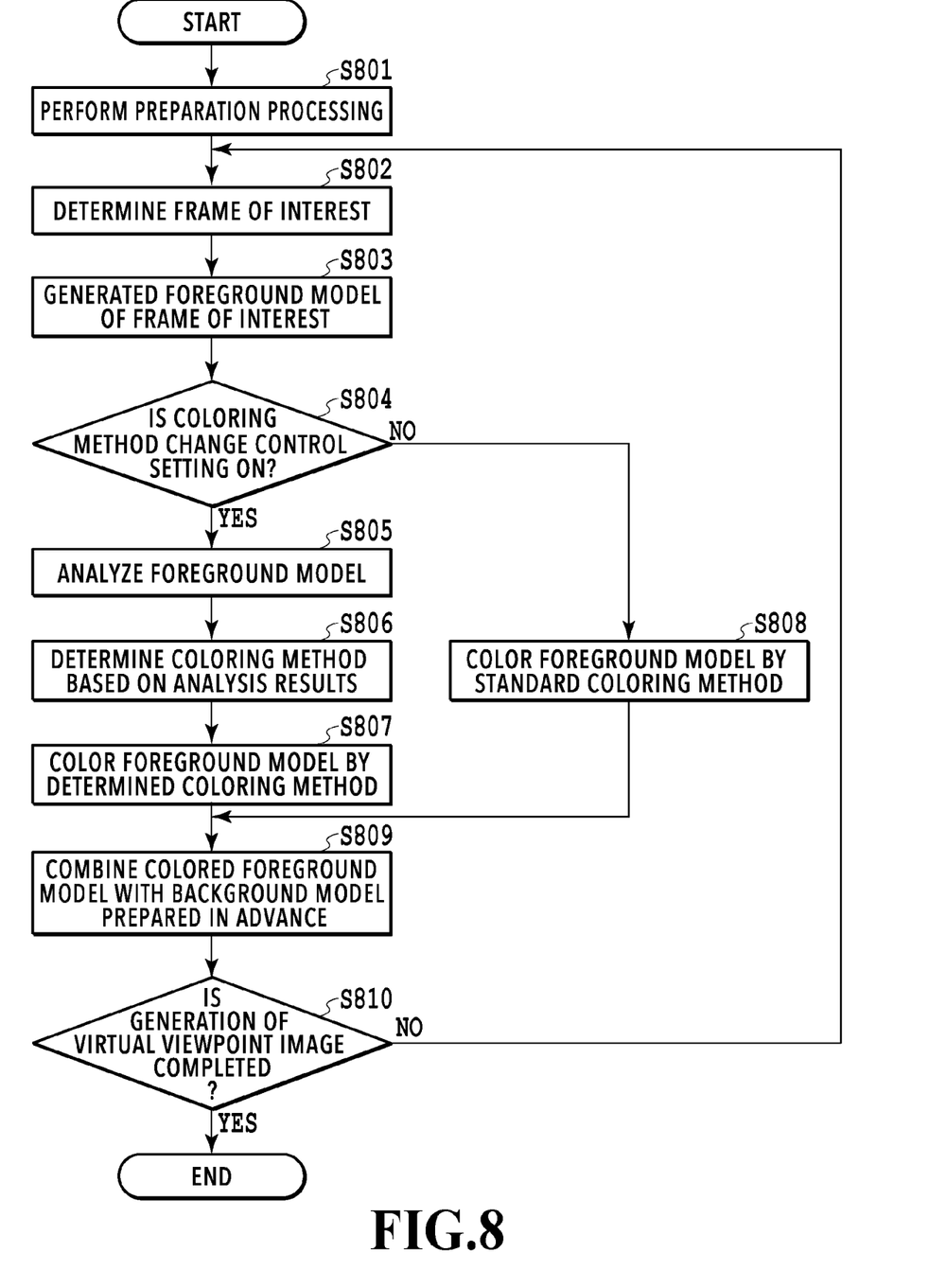
FIG. 8 is a flowchart showing a flow of processing to generate a virtual viewpoint image.

FIG. 8 is a flowchart showing a flow until a virtual viewpoint image is generated in the image processing apparatus 102 according to the present embodiment. The series of processing shown in the flowchart in FIG. 8 is implemented by the CPU 211 reading a control program stored in the ROM 212, the auxiliary storage device 214, or the like, loading the control program onto the RAM 213, and executing the control program. In the following explanation, symbol "S" means a step.

At S801, the preparation processing unit 301 performs the preparation processing described previously for generating a virtual viewpoint image based on user instructions via the controller 103. At next S802, in a frame group of a plurality of camera images obtained by the preparation processing at S801, the frame of interest, which is the target of a virtual viewpoint image, is determined. For example, in a case where the key frame is designated by a time code in the virtual viewpoint data, the frame of interest is determined based on the time code. Alternatively, it may also be possible to determine the frame of interest in order from the top frame in the frame group of the input camera image. At next S803, the foreground model generation unit 302 generates the foreground model of the object included in the frame of interest determined at 802.

At S804, the processing is branched in accordance with whether the setting of the operation mode of the coloring method change control is ON or OFF, which is set in the preparation processing at S801. Ina case where the setting of the operation mode is ON, the processing advances to S805 and in a case where the setting is OFF, the processing advances to S808. Each piece of the processing at subsequent S805 to S809 is performed by the virtual viewpoint image generation unit 303.

At S805, within the coloring processing unit 304, the analysis of the foreground model, which is the target of the coloring processing, is performed. At that time, the necessary analysis processing is performed by the analysis unit corresponding to the condition specified by the condition table read in the preparation processing at S801. For example, in a case where the position condition table (see FIG. 6A) that performs determination based on only the coordinate information has been read in the preparation processing, for the foreground model generated at S803, the coordinate information on each voxel is obtained by the position analysis unit 401.

At next S806, the coloring method determination unit 404 determines the coloring method by using the condition table read in the preparation processing at S801 based on the analysis results at S805. As described previously, this determination processing of the coloring method is performed for each voxel.

At S807 in a case where the operation mode is ON, the coloring unit 406 performs coloring processing for each voxel in accordance with the coloring method determined at S806. At this time, for the voxel corresponding to the noise portion of the foreground model, the coloring method different from the standard coloring method is used. Then, for the voxel corresponding to the portion other than the noise, the standard coloring method is used. By the coloring method such as this, the color without a sense of incongruity, which fits to the background in a case of being viewed from the virtual viewpoint, is attached to the foreground model generated at S803.

On the other hand, at S808 in a case where the operation mode is OFF, the coloring unit 406 performs coloring processing for each voxel of the foreground model by using the standard coloring method. FIG. 5B shows the results in a case where the foreground model 500 including the noise 501 in FIG. 5A is colored by the conventional method and an unnatural color (for example, green in a case of green back) is attached to the portion corresponding to the noise 501.

Figure 9A:
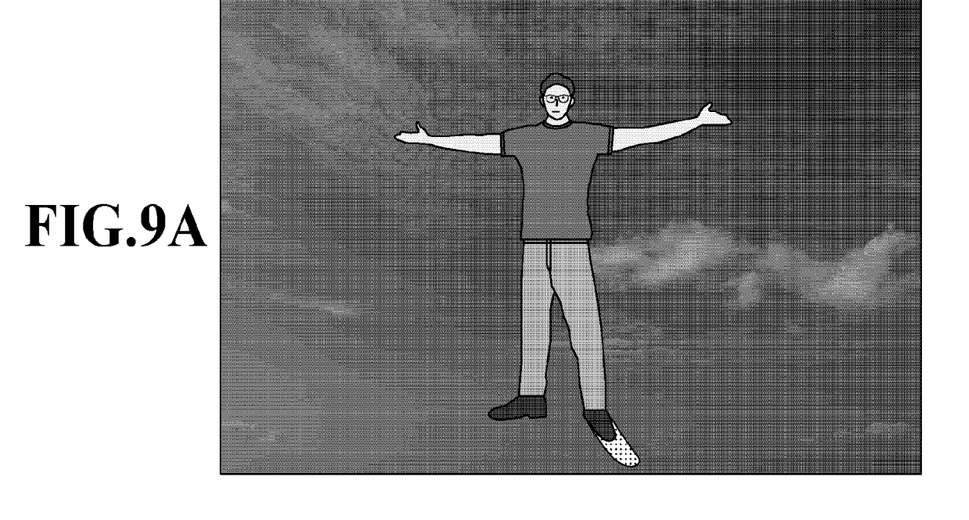
FIG. 9A is a diagram showing an example of a virtual viewpoint image in a case where coloring is performed by a conventional method and FIG. 9B is a diagram showing an example of a virtual viewpoint image in a case where coloring is performed by a method of the present embodiment.
Figure 9B:
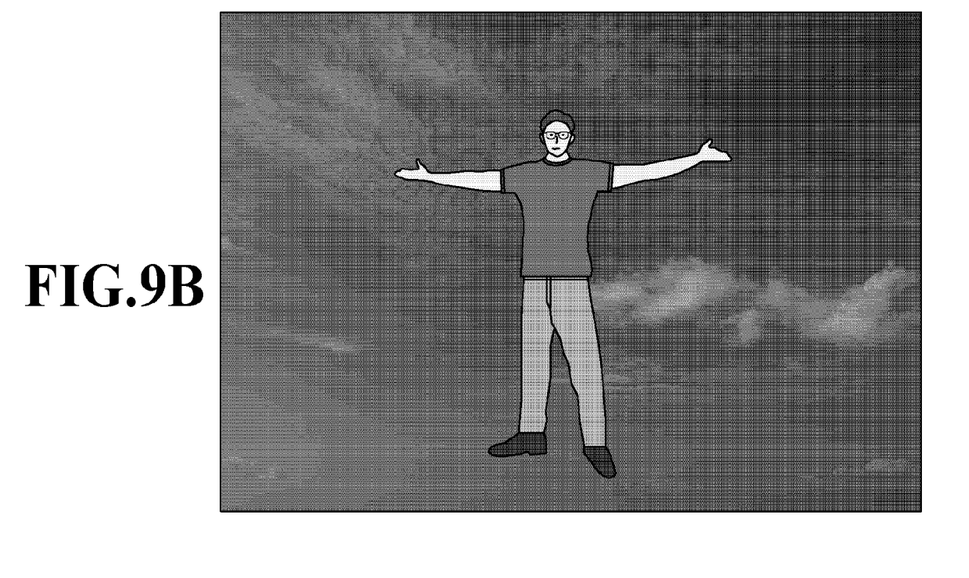

At S809, the combination unit 305 generates a virtual viewpoint image of the frame of interest by combining the colored foreground model with the background data prepared in advance. FIG. 9A is an example of a virtual viewpoint image obtained by performing coloring by the conventional method for the foreground model 500 including the noise shown in FIG. 5B described previously and further combining it with the background model of the sky. In a case of the conventional method, as a result of the color of the floor of the studio being attached to the noise portion abnormally extending from the toe of the left foot of a person, the image is such that the background model is not merged well. FIG. 9B is an example of a virtual viewpoint image obtained by performing coloring by the method of the present embodiment and combining it with the background model of the sky as in the case of FIG. 9A. Compared to FIG. 9A, the same color as the color of the background model is attached to the noise portion abnormally extending from the toe of the left foot and the image is such that the background model is merged well. The data of the generated virtual viewpoint image is sent to the display device 104 via the communication I/F 216 and displayed on the display device 104.

At S810, whether or not the generation of the virtual viewpoint image corresponding to the input virtual viewpoint data is completed is determined. In a case where the generation is completed, this processing is terminated and in a case where the generation is not completed, the processing returns to S802, and the next frame of interest is determined and the processing is continued.

The above is the flow of the virtual viewpoint image generation processing according to the present embodiment.

In the present embodiment, for simplicity, before the start of the processing, the setting of the operation mode relating to the coloring method change control, the selection of the condition table, and the like are performed, but it is also possible to enable to change the setting contents during the generation of a virtual viewpoint image and continue the processing by reflecting the changed contents after the setting is changed.

As above, according to the present embodiment, for each voxel constituting the foreground model, the coloring method is determined in accordance with a predetermined condition. Due to this, even in a case where a noise is included in the foreground model, it is possible to attach a color without a sense of incongruity, which fits to the background, to the noise portion.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to appropriately determine the color of a three-dimensional model of an object.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-092146, filed Jun. 1, 2021 which is hereby incorporated by reference wherein in its entirety.

What is claimed is:

1. An image processing apparatus comprising:
one or more memories storing instructions; and
one or more processors executing the instructions to:
   obtain shape data indicating a three-dimensional shape of an object, which is generated from a plurality of captured images of the object captured by a plurality of image capturing devices;
   specify a determination method of a color for shape data component based on analysis of the obtained shape data; and
   determine a color for the shape data component in accordance with the specified color determination method, wherein
the color determination method for a first portion, which corresponds to the object shape of the shape data component, is different from the color determination method for a second portion, which does not correspond to the object shape of the shape data component;
   in the obtaining, virtual viewpoint data including a position and a line-of-sight direction of a virtual viewpoint for generating a virtual viewpoint image is obtained,
   in the specifying:
      for the first portion, a first determination method is specified, which determines a color by using a color of one of the plurality of captured images determined based on the virtual viewpoint data;
      for the second portion, a second determination method different from the first determination method is specified,
   in the determining of a color, a color is determined for the shape data component by using the first determination method or the second determination method; and
   the specifying is performed by taking, among of the shape data components, the component belonging to a specified area in a three-dimensional space in which the image capturing has been performed and matching with a predetermined condition as the second portion.

2. The image processing apparatus according to claim 1, wherein
in the shape data, coordinate information indicating a position of the component in the three-dimensional space in which the image capturing has been performed is included and
in the specifying, for each of the components, a position in the three-dimensional space is analyzed based on the coordinate information and in a case where the position obtained by the analysis matches with a position condition specifying the second portion, the color determination method for the matched component is determined to be the second determination method.

3. The image processing apparatus according to claim 1, wherein
in the specifying, for each of the components, a color in a case where the first determination method is applied is analyzed and in a case where the color specified by the analysis matches with a color condition specifying the second portion, the color determination method for the matched component is determined to be the second determination method.

4. The image processing apparatus according to claim 1, wherein
in the specifying, for the shape data, a shape in the specified area in the three-dimensional space is analyzed and in a case where the shape specified by the analysis matches with a shape condition specifying the second portion, the color determination method for the component corresponding to the matched shape is determined to be the second determination method.

5. The image processing apparatus according to claim 1, wherein
the second determination method is determining no color.

6. The image processing apparatus according to claim 1, wherein
the second determination method is determining colorlessness.

7. The image processing apparatus according to claim 1, wherein
the second determination method is determining a fixed color determined in advance.

8. The image processing apparatus according to claim 1, wherein
the second determination method is determining the same color as the color of a background in the virtual viewpoint image.

9. The image processing apparatus according to claim 8, wherein
the second determination method is determining a color obtained by converting the color of the background.

10. The image processing apparatus according to claim 1, wherein
the one or more processors further execute the instructions to:
generate the virtual viewpoint image by combining shape data in which a color for a component is determined and background data in which a color for the component is determined in advance.

11. An image processing method comprising the steps of:
obtaining shape data indicating a three-dimensional shape of an object, which is generated from a plurality of captured images of the object captured by a plurality of image capturing devices;
specifying a determination method of a color for shape data component based on analysis of the obtained shape data; and
determining a color for the shape data component in accordance with the specified color determination method,
wherein
the color determination method for a first portion, which corresponds to the object shape of the shape data component, is different from the color determination method for a second portion, which does not correspond to the object shape of the shape data component;
in the obtaining, virtual viewpoint data including a position and a line-of-sight direction of a virtual viewpoint for generating a virtual viewpoint image is obtained,
in the specifying:
for the first portion, a first determination method is specified, which determines a color by using a color of one of the plurality of captured images determined based on the virtual viewpoint data;
for the second portion, a second determination method different from the first determination method is specified,
in the determining of a color, a color is determined for the shape data component by using the first determination method or the second determination method; and
the specifying is performed by taking, among of the shape data components, the component belonging to a specified area in a three-dimensional space in which the image capturing has been performed and matching with a predetermined condition as the second Portion.

12. A non-transitory computer readable storage medium storing a program for causing a computer to perform an image processing method comprising the steps of:
obtaining shape data indicating a three-dimensional shape of an object, which is generated from a plurality of captured images of the object captured by a plurality of image capturing devices;
specifying a determination method of a color for shape data component based on analysis of the obtained shape data; and
determining a color for the shape data component in accordance with the specified color determination method,
wherein
the color determination method for a first portion, which corresponds to the object shape of the shape data component, is different from the color determination method for a second portion, which does not correspond to the object shape of the shape data component;
in the obtaining, virtual viewpoint data including a position and a line-of-sight direction of a virtual viewpoint for generating a virtual viewpoint image is obtained,
in the specifying:
for the first portion, a first determination method is specified, which determines a color by using a color of one of the plurality of captured images determined based on the virtual viewpoint data;
for the second portion, a second determination method different from the first determination method is specified,
in the determining of a color, a color is determined for the shape data component by using the first determination method or the second determination method; and
the specifying is performed by taking, among of the shape data components, the component belonging to a specified area in a three-dimensional space in which the image capturing has been performed and matching with a predetermined condition as the second portion.

13. An image processing apparatus comprising:
one or more memories storing instructions; and
one or more processors executing the instructions to:
obtain shape data indicating a three-dimensional shape of an object, which is generated from a plurality of captured images of the object captured by a plurality of image capturing devices;
specify a determination method of a color for shape data component based on analysis of the obtained shape data; and
determine a color for the shape data component in accordance with the specified color determination method, wherein
the color determination method for a first portion, which corresponds to the object shape of the shape data component, is different from the color determination method for a second portion, which does not correspond to the object shape of the shape data component;
in the obtaining, virtual viewpoint data including a position and a line-of-sight direction of a virtual viewpoint for generating a virtual viewpoint image is obtained, in the specifying:
for the first portion, a first determination method is specified, which determines a color by using a color of one of the plurality of captured images determined based on the virtual viewpoint data;
for the second portion, a second determination method different from the first determination method is specified,
in the determining of a color, a color is determined for the shape data component by using the first determination method or the second determination method; wherein
the second determination method is determining a color obtained by converting a color in a case where the first determination method is applied.

14. The image processing apparatus according to claim 13, wherein
the conversion is reducing color luminance by a predetermined amount.

15. An image processing method comprising the steps of:
obtaining shape data indicating a three-dimensional shape of an object, which is generated from a plurality of captured images of the object captured by a plurality of image capturing devices;
specifying a determination method of a color for shape data component based on analysis of the obtained shape data; and
determining a color for the shape data component in accordance with the specified color determination method, wherein
the color determination method for a first portion, which corresponds to the object shape of the shape data component, is different from the color determination method for a second portion, which does not correspond to the object shape of the shape data component;
in the obtaining, virtual viewpoint data including a position and a line-of-sight direction of a virtual viewpoint for generating a virtual viewpoint image is obtained,
in the specifying:
for the first portion, a first determination method is specified, which determines a color by using a color of one of the plurality of captured images determined based on the virtual viewpoint data;
for the second portion, a second determination method different from the first determination method is specified,
in the determining of a color, a color is determined for the shape data component by using the first determination method or the second determination method; wherein
the second determination method is determining a color obtained by converting a color in a case where the first determination method is applied.

16. A non-transitory computer readable storage medium storing a program for causing a computer to perform an image processing method comprising the steps of:
obtaining shape data indicating a three-dimensional shape of an object, which is generated from a plurality of captured images of the object captured by a plurality of image capturing devices;
specifying a determination method of a color for shape data component based on analysis of the obtained shape data; and
determining a color for the shape data component in accordance with the specified color determination method, wherein
the color determination method for a first portion, which corresponds to the object shape of the shape data component, is different from the color determination method for a second portion, which does not correspond to the object shape of the shape data component;
in the obtaining, virtual viewpoint data including a position and a line-of-sight direction of a virtual viewpoint for generating a virtual viewpoint image is obtained,
in the specifying:
for the first portion, a first determination method is specified, which determines a color by using a color of one of the plurality of captured images determined based on the virtual viewpoint data;
for the second portion, a second determination method different from the first determination method is specified,
in the determining of a color, a color is determined for the shape data component by using the first determination method or the second determination method; wherein
the second determination method is determining a color obtained by converting a color in a case where the first determination method is applied.

17. An image processing apparatus comprising:
one or more memories storing instructions; and
one or more processors executing the instructions to:
obtain shape data indicating a three-dimensional shape of an object, which is generated from a plurality of captured images of the object captured by a plurality of image capturing devices;
specify a determination method of a color for shape data component based on analysis of the obtained shape data; and
determine a color for the shape data component in accordance with the specified color determination method,
set an operation mode for the determining, wherein
the specifying is performed in a case where the operation mode is set to ON, and
in the determining of a color in a case where the operation mode is set to OFF, a color is determined for the shape data component by a method of determining a color by using a color of one of the plurality of captured images; and
the color determination method for a first portion, which corresponds to the object shape of the shape data component, is different from the color determination method for a second portion, which does not correspond to the object shape of the shape data component.

18. An image processing method comprising the steps of:
obtaining shape data indicating a three-dimensional shape of an object, which is generated from a plurality of captured images of the object captured by a plurality of image capturing devices;
specifying a determination method of a color for shape data component based on analysis of the obtained shape data; and
determining a color for the shape data component in accordance with the specified color determination method,
set an operation mode for the determining, wherein
the specifying is performed in a case where the operation mode is set to ON, and
in the determining of a color in a case where the operation mode is set to OFF, a color is determined for the shape data component by a method of determining a color by using a color of one of the plurality of captured images; and
the color determination method for a first portion, which corresponds to the object shape of the shape data component, is different from the color determination method for a second portion, which does not correspond to the object shape of the shape data component.

19. A non-transitory computer readable storage medium storing a program for causing a computer to perform an image processing method comprising the steps of:
obtaining shape data indicating a three-dimensional shape of an object, which is generated from a plurality of captured images of the object captured by a plurality of image capturing devices;
specifying a determination method of a color for shape data component based on analysis of the obtained shape data; and
determining a color for the shape data component in accordance with the specified color determination method,
set an operation mode for the determining, wherein
the specifying is performed in a case where the operation mode is set to ON, and
in the determining of a color in a case where the operation mode is set to OFF, a color is determined for the shape data component by a method of determining a color by using a color of one of the plurality of captured images; and
the color determination method for a first portion, which corresponds to the object shape of the shape data component, is different from the color determination method for a second portion, which does not correspond to the object shape of the shape data component.

* * * * *